June 16, 1953  R. C. RUSSELL  2,642,051
SELF-ADJUSTING VALVE MECHANISM
Filed Aug. 28, 1951  2 Sheets-Sheet 2
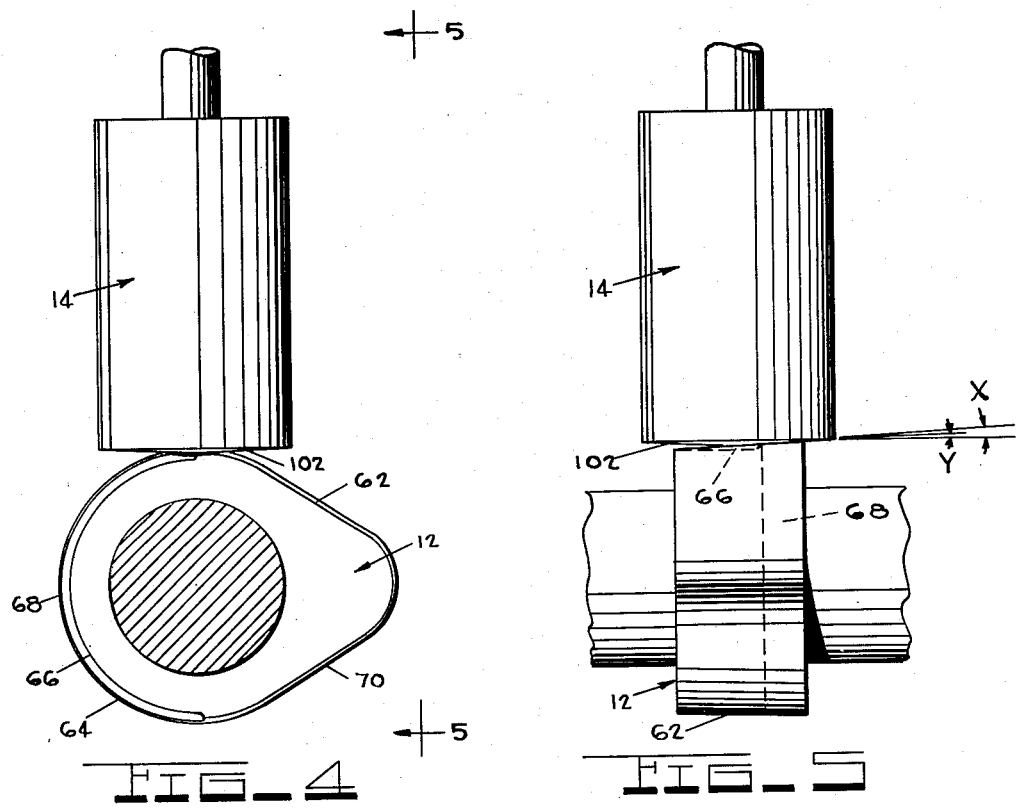
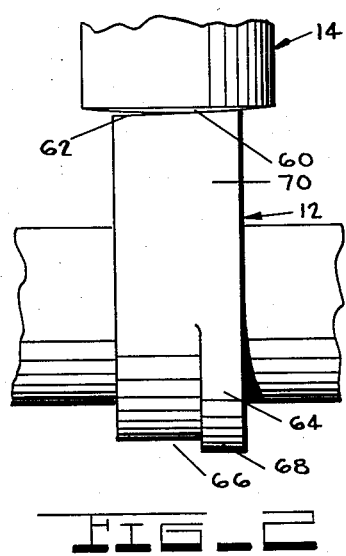
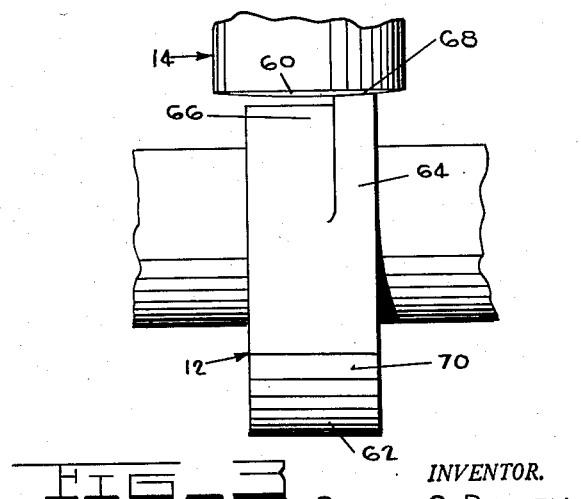
INVENTOR.
ROBERT C. RUSSELL
BY
*McDonald & Teagno*
ATTORNEYS Patented June 16, 1953

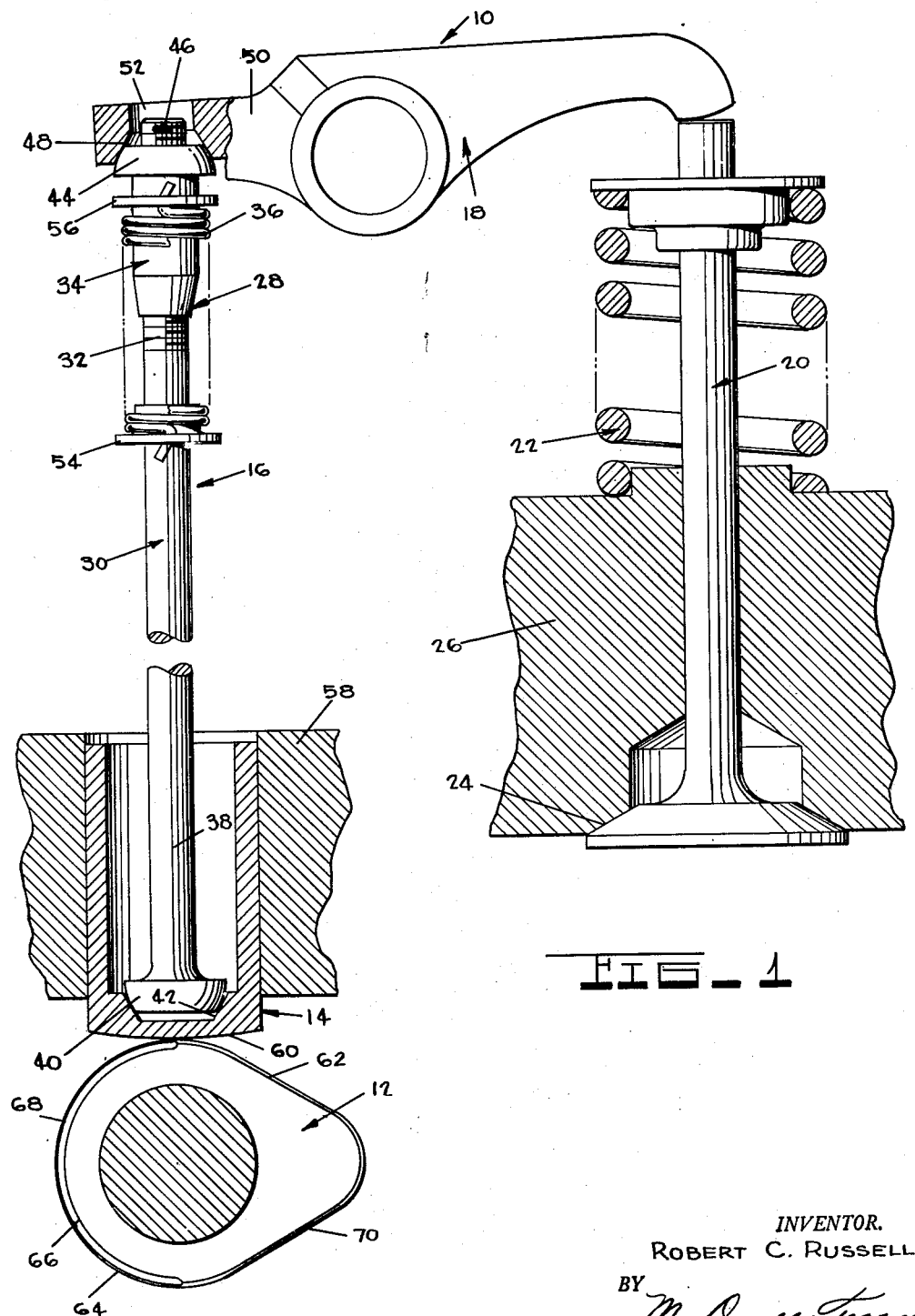
FIG_1

2,642,051

UNITED STATES PATENT OFFICE 2,642,051

SELF-ADJUSTING VALVE MECHANISM

Robert C. Russell, Euclid, Ohio, assignor to Eaton Manufacturing Company, Cleveland, Ohio, a corporation of Ohio Application August 28, 1951, Serial No. 243,948

12 Claims. (Cl. 123—90)

This invention relates to valve operating mechanism for internal combustion engines and more particularly to mechanical means for automatically compensating for variations in length of the operating components of said mechanism.

Broadly the invention comprehends the provision of mechanical self-adjusting mechanism in the form of a torsion spring loaded screw and nut assembly incorporated in the component members of a valve operating mechanism and wherein through a prescribed turning of one member of the screw and nut assembly relative to the other member thereof a shortening or elongating compensation for the valve operating mechanism is attained. As a means of ensuring the turning of one member of the screw and nut assembly during the course of a valve operation the cooperating cam and tappet of the valve operating mechanism are structurally formed whereby during the course of rotative engagement of the cam on the tappet a varying degree of turning is imparted to the tappet which turning is directly imparted to one member of the screw and nut assembly.

Among the several objects of the invention are the provision of a mechanical self-adjusting internal combustion engine valve operating mechanism that:

1. Is simple and economical of construction;
2. Is effective and efficient in operation;
3. Ensures of a long service-free life of all the component parts of the valve operating mechanism;
4. Ensures an automatic shortening or elongation adjustment of the valve operating mechanism to compensate for expansion, contraction, wear and etc.;
5. Provides for distribution of wear upon the cam contacting face of a tappet member of the valve operating mechanism;
6. Includes a torsion spring loaded nut and screw member assembly effective through the rotative movement of one of the members relative to the other member to vary the length of the assembly and consequently the length of the valve operating mechanism; and
7. Includes a spherical surfaced tappet engageable by a base circle recessed angular faced cam providing for the rotation of the tappet as engaged by the cam when a certain predetermined load is imposed therebetween, said rotation of the tappet being in turn imparted to one member of the nut and screw assembly.

Other objects and advantages of the invention will appear from the following description taken in connection with the drawings forming a part of the specification; and in which:

Fig. 1 is a partly elevational partly cross-sectional view of a valve operating mechanism incorporating automatic length compensation means therein;

Fig. 2 is a fragmentary elevation view of the cam and tappet of Fig. 1 with the cam surface at the apex of the ramp engaging the tappet;

Fig. 3 is a fragmentary elevation view similar to Fig. 2 with the cam rotated to engagement of the base circle at its midpoint with the tappet;

Fig. 4 is a partly elevational, partly cross-sectional view of a valve operating mechanism incorporating a modified form of tappet from that shown by Fig. 1; and Fig. 5 is a fragmentary view taken substantially along lines 5—5 of Fig. 4.

Similar reference characters indicate corresponding parts throughout the several views of the drawings.

This valve operating mechanism incorporating automatic length compensating means therein was devised primarily for the purpose of providing mechanism of simple and economical construction which was effective in operation and afforded long service-free life.

The compensation means of the mechanism constitutes basically a torsion spring loaded screw and nut member assembly operative upon relative rotation therebetween to vary the length of the assembly.

As a means providing for rotation of one of the members of the assembly the tappet of the valve operating mechanism is provided with a crowned (spherical or conical) cam contacting surface engageable by the peripheral surface of an angular faced cam. In this way the zone of engagement of the cam is at a radius arm to the central axis of the tappet to thereby provide for a turning of the tappet as the cam is rotated. Furthermore the cam is recessed a predetermined portion of its width along the base circle thereof so as to provide a contact zone along the base circle portion of the cam which is at a larger radius arm than the radius arm of contact along the remainder of the cam. The amount of rotation imparted to the tappet which is in turn directly transmitted to the screw and nut assembly for the length adjustment thereof depends on speed of operation, inertia forces, oil and etc. tending to cause slippage between the contacting surfaces of the cam and tappet.

Referring to the drawings for more specific details of the invention 10 represents generally a valve operating mechanism for an internal combustion engine comprising as component members thereof a cam 12, a tappet 14, a pushrod assembly 16, a rocker arm 18 and a valve 20.

As will be noted in viewing Fig. 1, the valve operating mechanism is shown virtually at rest wherein the cam upon clockwise movement thereof has just moved to its base circle portion and the valve has been actuated by valve spring 22 to closed position on its seat 24 in engine block 26.

An automatic length compensating device 28 for the valve operating mechanism is incorporated in pushrod assembly 16, the purpose and operation of which will hereinafter be stated.

The pushrod assembly includes a preferably slender screw element 30 having a screw threaded portion 32 at one end thereof, a nut element 34 threadingly engageable upon the screw threaded portion of element 30 and a torsion spring 36 interconnected between the nut and screw elements normally biasing them apart from one another.

The screw element 30 includes in addition to the screw threaded portion, an opposite axially extended portion 38 terminating at its extremity 40, opposite axially disposed from the threaded portion, in a portion of a sphere. The spherical end of the screw element is received in annular line bearing relation in a conical shaped socket 42 formed internally of tappet 14.

The nut element 34 in being threaded upon the screw element is normally positioned within the axial confines of the screw element such that a part of said threaded portion of the screw element protrudes axially outwardly beyond the outer end 44 of the nut element. A thread obstruction 46 is provided near the extremity of the threaded portion of the screw element serving to inhibit movement of the nut element off of the screw element and thus establishing the maximum extent to which adjustment for lengthening of the pushrod can be made.

A spherical surface is provided upon outer end 44 of the nut adapted to have annular line bearing engagement with a conical shaped socket 48 formed as part of one arm 50 of rocker arm 18. With the threaded portion of screw element 30 extending axially beyond the nut element 34 and with the spherical end 44 of the nut element in bearing relation in socket 48 of the rocker arm, the threaded portion is received in an apreture 52 in the rocker arm concentric with the socket.

The torsion spring 36 is arranged in telescoping relation to the nut and screw elements under load with its opposite extremities secured respectively upon a collar 54 of the screw element and a collar 56 of the nut element tending to bias the screw and nut elements apart from one another. The pre-load of the spring is to be of an amount sufficient to permit of elongation of the pushrod to the extent of adjustment permitted.

The screw and nut elements are threaded righthanded as shown by Fig. 1 and preferably are to be of as low an angle as possible, such for example as ¼-20 threads.

Tappet 14 is supported for reciprocation in a tappet guide 58 and as such is free to rotate therein without interference.

A crowned or spherical cam engaging surface 60 is provided on one end of the tappet oppositely disposed from socket 42 thereof adapted for engagement with an angular contacting surface 62 of cam 12. By making surface 60 of predetermined spherical form sufficient alignment can be attained between the engageable surfaces of the cam and tappet such that the cam surface can be made to engage precisely at or near desired locations or zones of the tappet surface 60.

The curvature of the tappet surface 60 and the angularity of the contacting surface 62 of the cam 12 are purposely exaggerated to show comparison and contacting relation therebetween effective to provide for the desired cooperative operation therebetween.

The cam 12 in addition to having an angular surface 62 is provided across the major portion of its base circle 64 with a relief 66 extending from the smallest diameter portion of the cam toward the largest diameter portion thereof such as to present a flange 68 offset to one side of the zone of contact of the cam surface 62 with the tappet surface 60. In this way the contact line or zone along the base circle of the cam occurs at a substantially greater radius arm than the radius arm of contact of the ramp portion 70 contacting surface 62 of the cam, the purpose of which will hereinafter appear.

In a normal operation of the valve operating mechanism of Fig. 1 assuming that as shown the component valve 20, rocker arm 48, pushrod assembly 16, tappet 14 and cam 12 are in reasonably perfect engagement to one another, that is with zero clearance throughout and with no other load than that of torque spring 36, a rotation of the cam in a clockwise direction from the position shown all the way across the base circle of the cam to the beginning of ramp portion 70 will cause appreciably no actuation of any other component member of the valve operating mechanism. This result is occasioned by the fact that since appreciably no load is imposed between the radius arm of contact of the flange 68 of the cam and the tappet surface 60, the surface 62 of the flange will slip across the cam surface. Should any turning movement be imparted to the tappet which in turn is transmitted to the screw element of the pushrod acting to shorten the pushrod, the torque spring 36 will act to immediately restore the pushrod assembly to normal length and maintain zero clearance throughout the valve operating mechanism and thus no actual movement of the rocker arm and valve will occur.

The friction provided between the end 40 of the screw element of the pushrod and the socket 42 of the tappet need be of an amount sufficient to provide for the coupled turning of the tappet and the screw element in a clockwise direction to overcome the combined turning resistance offered by the threads of the screw and nut elements in a threading together thereof and the pre-load of torsion spring 36 while at the same time permitting of the relative movement of the tappet to the screw element in a counter-clockwise direction against the resistance offered by the threads in attempting to thread them apart when a load is imposed thereon. It is to be understood that this friction provided between the screw element and tappet as relates to the nut and screw elements assembly as above defined is effected by a load imposed on the component members of the valve operating mechanism such as by the valve spring 22.

The friction between the spherical end 42 of the nut element and the socket 46 of the rocker arm is to be of an amount sufficient to resist the turning resistance between the threads of the screw and nut elements as regards the action of the screw element threading into the nut element for a shortening operation of the pushrod.

The friction engagement had between the spherical end of the nut element and the socket of the rocker arm and between the spherical end of the screw element and the socket of the tappet is purposely made of an annular line bearing nature so as to prevent oil film formation between these surfaces which would ordinarily tend to destroy an established friction relation therebetween especially since the continued maintenance of a substantially predetermined friction is essential to proper operation of the adjusting device and the valve operating mechanism.

As the cam is further rotated, from the point where the base circle merges into the ramp, until where the ramp merges with the base circle on substantially the diametrically opposite side of the cam, an opening or lifting and a closing cycle of operation of the valve occurs. During this cycle of operation with the valve spring 22 offering resistance to movement of the valve a linear load is imposed upon the component members of the valve operating mechanism such that zero clearance engagement is had between the valve and an arm of the rocker arm, the arm 48 of the rocker arm and the nut element, the nut element in turn transmitting its linear motion to the screw element without normal relative movement therebetween, the screw element engaging the tappet and the tappet engaging the cam. With this condition of engagement existing between the members of the valve operating mechanism and with the surface on the ramp of the cam engaging the tappet at a given radius arm dependent on the curvature of the tappet surface and the angularity of the cam a slight turning movement is imparted to the tappet and consequently a relative rotation of the screw and nut elements with a resultant shortening of the length of the pushrod assembly whereby a small amount of lift loss is introduced into the valve operating mechanism. This lift loss is negligible since inertia forces of the mechanism, resistance to threading apart of the nut and screw elements with the valve spring load imposed thereon, lubrication in the tappet guide and other such factors provide for slippage of a high degree between the engageable surfaces of the cam and tappet in view of the small radius or torque arm contact therebetween. As a further means of ensuring a minimum of lift loss the threads of the nut and screw elements are preferably made of low pitch.

Immediately with the cam returning to its base circle portion the valve spring load is removed from the valve operating mechanism if no expansion has occurred in the length of the mechanism tending to hold the valve off its seat. If expansion has occurred during the previous opening and closing cycle of the valve causing the valve spring load to bear lineally on the component members of the mechanism, a load will be borne between the tappet and cam surfaces such that as the cam flange 68 bears against the tappet surface 60 a turning of the tappet will occur, said turning thereof to be transmitted by way of the friction connection between the tappet and screw element to turn the screw clockwise. Simultaneously with the screw element being turned the nut element by way of its friction connection with the rocker arm is held against turning inasmuch as the resistance to turning thereof is greater than the resistance of the thread and the preload of spring 36 permitting of relative turning between the screw and nut elements, whereby the pushrod is shortened. This shortening will take place only so long as the valve is held open and the valve spring load remains imposed on the valve operating mechanism whereupon with its release and substantially no load being imposed between the tappet and cam, the flange will cease to be able to rotate the tappet and thus will only have surface sliding relation with regards to the cam.

Should contraction or wear occur in the valve operating mechanism during the opening and closing operation of the valve, the torsion spring 36 will immediately function to compensate therefor as the cam returns to its base circle position in relation to the tappet thus preventing the introduction of clearance in the mechanism by elongating the pushrod through the relative motion of unthreading the screw and nut elements from one another. This movement immediately brings about engagement once again of all the component members of the valve operating mechanism.

Thread obstruction 46 in addition to maintaining the screw and nut elements in coupled assembly prior to installation and use in a valve operating mechanism also insures against over adjustment which might otherwise occur if the valve was caused to be stuck open and thereby prevents any serious damage to the engine block.

Through the use of the angular surface 62 on the cam lying in the direction shown an assured contact is had between the cam surface 62 and the tappet surface 60 at a radius arm tending for rotation of the tappet in the same direction as the contact radius arm of flange 68 and the tappet surface 60. In view of this contact arrangement between the tappet and cam surfaces a proper operational adjustment of the pushrod assembly is effected while simultaneously a distribution of load is made across the tappet surface 60 to so prolong the life thereof.

Figs. 4 and 5 illustrate a modified form of tappet 100 from that disclosed by the structure of Figs. 1 through 3 in that the cam contacting surface 102 thereof is of truncated conical form such that upon provision of greater angularity on the cam surface as compared to the angularity of surface 62 of the cam a high degree of misalignment can occur from a right angle relation of the axes of the tappet and cam without changing the predetermined desired radius arm of contact between the ramp and base circle contact surfaces of the cam. X represents the angularity of the conical surface of the tappet and Y the angularity of the cam surface.

The mode of operation of the structure of Figs. 4 and 5 is identical with that of Figs. 1 through 3 and accordingly the recitation of operation is dispensed with.

Although the various structures have been shown and defined in regards to specific structural forms and to particularly specific applications many departures can be made therein without changing the basic fundamentals involved and accordingly the invention is to be limited only as indicated by the appended claims.

What I claim is:

1. A valve operating mechanism comprising a threadingly engaged screw and nut members assembly, a spring normally biasing the members apart, a rotatable cam including a ramp portion and a base circle portion presenting a peripheral surface lying substantially uniformly angularly to the axis of the cam, said base circle portion being recessed throughout substantially its entire surface to so provide a peripheral flange of narrower width than the remaining peripheral surface of the cam with the flange on the maximum diameter portion of the cam, and means, reciprocable along an axis substantially at right angles to the axis of rotation of the cam engageable with one of the threadingly engaged screw and nut members assembly, having a crowned cam contacting surface engageable with the peripheral surface of the cam, including the surface of the flange, at zones on the cam surface disposed to one side of a plane passing medially through the means having the crowned surface and lying at right angles to the axis of rotation of the cam.

2. A mechanism according to claim 1 wherein the means constitutes a tappet.

3. A mechanism according to claim 2 wherein the threadingly engaged screw and nut members assembly constitute a pushrod.

4. A mechanism according to claim 3 wherein the valve operating mechanism includes a rocker arm frictionally connected with the end of the pushrod opposite from the tappet engagement therewith.

5. A mechanism according to claim 1 wherein the crowned cam contacting surface is substantially spherical in form.

6. A mechanism according to claim 1 wherein the crowned cam contacting surface is substantially a truncated cone.

7. A mechanism according to claim 6 wherein the angularity on the face of the cone is offset a greater amount to the axis of the cam than the angular surface on the cam.

8. A mechanism according to claim 1 wherein the frictional resistance to turning between the means and the screw and nut members assembly is greater than the frictional resistance to threading up of the screw and nut members assembly when under compressive load.

9. A mechanism according to claim 4 wherein the frictional resistance to turning between the opposite ends of the pushrod and the rocker arm and tappet respectively is greater than the frictional resistance to threading up of the screw and nut members assembly when under compressive load.

10. A mechanism according to claim 1 wherein the threads of the screw and nut members are of low pitch.

11. A mechanism according to claim 1 wherein the major peripheral surface of the cam contacts the crowned cam contacting surface of the means at a shorter radius arm than the peripheral surface of the flange on the base circle portion of the cam.

12. Mechanism adapted to be embodied in an automatic length adjusting device forming a part of an engine valve gear operating system comprising a rotative cam including a ramp portion and a base circle portion presenting a peripheral surface lying uniformly angularly to the axis of the cam, said base circle portion being recessed throughout substantially the entire length of its surface to so provide a peripheral flange of narrower width than the remaining peripheral surface of the cam, and a reciprocal and rotative tappet having a crowned cam-contacting surface engageable with the peripheral surface of the cam at zones on said cam surface disposed to one side of a plane passing substantially through the axis of the tappet and reciprocable along an axis lying substantially at right angles to the axis of rotation of the cam whereby the surface of the flange on the base circle portion of the cam engages the tappet surface at a larger radius arm than the remaining surface of the cam effective to provide for a much greater degree of rotation of the tappet in one direction than that imparted by the remaining surface of the cam in the same direction of rotation.

ROBERT C. RUSSELL.

References Cited in the file of this patent

UNITED STATES PATENTS

| Number | Name | Date |
|---|---|---|
| 1,305,397 | Murdock | June 3, 1919 |
| 1,470,102 | Rahm | Oct. 9, 1923 |
| 1,820,890 | Spiller | Aug. 25, 1931 |
| 1,820,891 | Spiller | Aug. 25, 1931 |
| 1,903,078 | Woolman | Mar. 28, 1933 |
| 1,905,888 | Berry | Apr. 25, 1933 |
| 2,081,390 | Trapp | May 25, 1937 |
| 2,419,316 | Engemann | Apr. 22, 1947 |